United States Patent
Nimura

(10) Patent No.: US 7,811,402 B2
(45) Date of Patent: Oct. 12, 2010

(54) POLYMER RECOVERY METHOD FROM POLARIZING PLATES AND METHODS OF PRODUCING RECYCLED POLYMER FILMS AND POLARIZING PLATES

(75) Inventor: Shigeaki Nimura, Minami-ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 373 days.

(21) Appl. No.: 11/907,052

(22) Filed: Oct. 9, 2007

(65) Prior Publication Data

US 2008/0128076 A1 Jun. 5, 2008

(30) Foreign Application Priority Data

Oct. 11, 2006 (JP) ............................ 2006-278034

(51) Int. Cl.
- *B29C 73/00* (2006.01)
- *B29C 65/00* (2006.01)
- *B29C 63/00* (2006.01)
- *B32B 43/00* (2006.01)
- *B32B 37/00* (2006.01)
- *B32B 38/10* (2006.01)
- *G02F 1/1335* (2006.01)
- *C09K 19/00* (2006.01)

(52) U.S. Cl. .................... 156/247; 156/94; 156/344; 349/96; 428/1.31

(58) Field of Classification Search .............. 156/60, 156/94, 98, 99, 101, 153, 247, 344, 242, 156/243, 244.1, 244.23, 244.24, 246, 254; 349/96; 359/483, 485, 490, 491, 494, 500; 428/1.3, 1.31, 1.1

See application file for complete search history.

(56) References Cited

U.S. PATENT DOCUMENTS

| 6,512,562 | B1 * | 1/2003 | Kobayashi et al. .......... 349/122 |
| 2002/0025444 | A1 * | 2/2002 | Hebrink et al. ............. 428/480 |
| 2009/0257003 | A1 * | 10/2009 | Yoshihara et al. ............. 349/96 |

FOREIGN PATENT DOCUMENTS

| JP | 11021483 A | * | 1/1999 |
| JP | 2001-181440 A | | 7/2001 |
| JP | 2001213995 A | * | 8/2001 |
| JP | 2001300939 A | * | 10/2001 |
| JP | 2002018848 A | * | 1/2002 |
| JP | 2002179835 A | * | 6/2002 |
| JP | 2003003009 A | * | 1/2003 |
| JP | 2003-195048 A | | 7/2003 |
| JP | 2004169005 A | * | 6/2004 |
| JP | 2004203963 A | * | 7/2004 |
| JP | 2001-213995 A | * | 8/2007 |

* cited by examiner

*Primary Examiner*—Richard Crispino
*Assistant Examiner*—Brian R Slawski
(74) *Attorney, Agent, or Firm*—Buchanan Ingersoll & Rooney PC

(57) ABSTRACT

A method for recovery of polymer, comprising contacting a polarizing plate comprising a polarizing element and first and second polymer films on its both surfaces, with at least an aqueous liquid, and then applying shear force to the polarizing plate to thereby separate the polarizing element and at least the first polymer film, is disclosed.

9 Claims, No Drawings

POLYMER RECOVERY METHOD FROM POLARIZING PLATES AND METHODS OF PRODUCING RECYCLED POLYMER FILMS AND POLARIZING PLATES

CROSS-REFERENCE TO RELATED APPLICATIONS

This application claims benefit of priority under 35 U.S.C. 119 to Japanese Patent Application No. 2006-278034, filed Oct. 11, 2006, and the entire content of the application is incorporated herein by reference.

BACKGROUND OF THE INVENTION

1. Field of the Invention

The present invention relates to a method for recovery of polymer from polarizing plates, and to a method for producing recycled polymer films and polarizing plates employing recycled polymers.

2. Related Art

Polarizing plates are used in image display devices such as liquid-crystal display devices. As a polarizing plate, much used are those comprising a polarizing element of a polyvinyl alcohol film or the like dyed with a dichroic dye such as iodine, in which a transparent protective film, triacetyl acetate (TAC) film is stuck to one or both surfaces of the element. The polarizing plate is generally produced as a long film, and then cut into a predetermined size and used in liquid-crystal display devices, etc. However, depending on the required dimensions or directions of absorption axes thereof, the area yield of polarizing plates are poor, which generates a problem in that the production process gives a large quantity of industrial wastes.

For example, for recovery of polymer that is a material of protective film from polarizing plate, there are known a method of recovery of a cellulose ester by processing a polarizing plate with water (Japanese Laid-Open Patent Publication No. 2001-181440), and a method of production of a recycled TAC film, comprising processing a polarizing plate having a TAC film as a protective film with a solvent to give a TAC solution, and forming a film from the solution (Japanese Laid-Open Patent Publication No. 2003-195048).

On the other hand, with the recent requirement for high-quality and thin-body liquid-crystal displays, the polarizing plate to be used in them is also required to have a bettered quality; and for the purpose of producing such a high-quality polarizing plate, a film that differs from a TAC film or the like cellulose ester film in the physical and chemical properties thereof has become used as a protective film for the polarizing plate. For example, as an example thereof having improved durability, there is proposed a polarizing plate that comprises a film having a smaller moisture permeability than a TAC film as one protective film therein.

As above, conventional polarizing plates generally have the same protective film on both surfaces of the polarizing element therein; recently, however, a polarizing plate in which both surfaces of the polarizing element are asymmetrically protected with different protective films are being put into practical use, for which, therefore, a recycling method is necessary that comprises separately recovering the different protective films from the thus-constructed polarizing plate. However, when the asymmetric polarizing plate of the type is processed according to the above-mentioned recovery method heretofore proposed, then the protective films stuck to both surfaces of the polarizing element may be mixed during the processing procedure, and therefore they could not be recovered separately. For example, when the protective films are dissolved in a predetermined solvent according to the method described in the above mentioned Japanese Laid-Open Patent Publication No. 2003-195048, then the materials of the protective films may mix together therefore resulting in that both the recovered materials are much contaminated with impurities. On the other hand, when the protective films are peeled away from the polarizing element through processing with water according to the method described in the above mentioned Japanese Laid-Open Patent Publication No. 2001-181440, there also occurs a problem in that the protective films mix together. Naturally, for recovered and recycled materials, it is desirable that the impurities therein are minimized as much as possible.

SUMMARY OF THE INVENTION

An object of the invention is to provide a method capable of effectively recovering polymer from polymer films used as a protective film not only in symmetric polarizing plates where polymer films of the same type are used as protective films on both surfaces of a polarizing element but also even in asymmetric polarizing plates where different polymer films are used as them.

Another object of the invention is to provide a method for production of a recycled polymer film and a polarizing plate, which employs polymer recovered according to the above method.

In one aspect, the present invention provides a method for recovery of polymer, comprising:

contacting a polarizing plate comprising a polarizing element and first and second polymer films on its both surfaces, with at least an aqueous liquid, and then applying shear force to the polarizing plate to thereby separate the polarizing element and at least the first polymer film.

As embodiments of the present invention, there are provided, the method wherein moisture permeability of the first and second polymer films are different from each other; the method wherein shear force of from 1 N to 200 N per $cm^2$ of the area of the polarizing plate is applied; the method wherein the aqueous liquid is water; and the method wherein the aqueous liquid is a mixed liquid of water and a water-miscible compound having at least one hydroxy group and having from 1 to 6 carbon atoms.

The method of the present invention may further comprise pulverizing or cutting a polarizing plate into atypical or square chips before it is contacted with at least an aqueous liquid.

The method of the present invention may further comprise contacting a polarizing plate with an aqueous liquid to thereby separate a polarizing element and a second polymer film, after a first polymer film and the polarizing element are separated.

In another aspect, the present invention provides a method for producing a recycled polymer film, comprising melting or dissolving in solvent a polymer recovered according to the above mentioned method, and forming a resulting melt or solution into a film; and a method for producing a polarizing plate, comprising melting or dissolving in solvent a polymer recovered according to the above mentioned method, then forming a resulting melt or solution into a film to produce a recycled polymer film, and laminating the recycled polymer film onto at least one surface of a polarizing element.

According to the invention, it is possible to provide a method capable of effectively recovering polymer from polymer films used as a protective film not only in symmetric polarizing plates where polymer films of the same type are used as protective films on both surfaces of a polarizing element but also even in asymmetric polarizing plates where different polymer films are used as them.

According to the invention, it is also possible to provide a method for production of a recycled polymer film and a polarizing plate, which employs polymer recovered according to the above method.

DETAILED DESCRIPTION OF THE INVENTION

Paragraphs below will detail the present invention. It is to be understood that the expression "to" in this specification means the range determined by numerals placed therebefore and thereafter, user for indicating the lower limit and the upper limit, respectively.

[Recovery of Polymer]

The invention relates to a method comprising separating polymer films respectively from a polarizing plate that comprises a polarizing element and first and second polymer films on both surfaces thereof, and recovering them.

According to the method of the invention, a polarizing plate to be processed is kept in contact with at least an aqueous liquid. In terms of attaining rapid treatment, it is desirable that the polarizing plate is pulverized or cut and then contacted with an aqueous liquid. Not specifically defined, the shape of the pulverized or cut polarizing plate is, in general, preferably atypical or in the form of small square chips. Pulverizing or cutting the polarizing plate may be carried out with various devices such as monoaxial grinders produced by Kubota, and RC-1000 produced by Makino Sangyo.

The aqueous liquid to be used in the invention may be water alone, or may be a mixed liquid of water and an organic compound. The organic compound is preferably selected from water-miscible compounds having at least one hydroxy group and having from 1 to 6 carbon atoms. Examples of such a compound include, but are not limited to, methanol, ethanol, n-propanol, i-propanol, n-butanol, i-butanol, s-butanol, t-butanol, ethylene glycol, 1,3-trimethylene glycol, 1,4-tetramethylene glycol, diethylene glycol, glycerin, trimethanolethane, trimethanolpropane, pentaerythritol, cyclohexanol, glucose, pentose, xylitose, xylitol. In the mixed liquid to be used as the aqueous liquid, the content of the organic compound is preferably from 0.1 to 99.9% by mass, more preferably from 10 to 90% by mass, even more preferably from 30 to 80% by mass. However, depending on the solubility in water of these compounds, the preferred content range as above may vary.

For contacting a polarizing plate with an aqueous liquid, various treatments may be employable, for example, dipping a polarizing plate in an aqueous liquid, spraying an aqueous liquid on a polarizing plate, and applying an aqueous liquid to a polarizing plate. For the dipping treatment, the aqueous liquid in which a polarizing plate is dipped may be stirred for attaining rapid treatment. The treatment may be attained at room temperature, but if desired, the temperature of the aqueous liquid may be controlled. The preferred temperature range of the aqueous liquid varies depending on the type of the aqueous liquid used (when it is a mixed liquid, the type of the organic compound and its blend ratio), but in general, it is preferably from 20 to 100° C., more preferably from 35 to 80° C. Also preferably, the pH of the aqueous liquid is around neutral, more preferably from 6.0 to 8.0, even more preferably from 7.0 to 8.0. For pH control thereof, the aqueous liquid may contain a pH-buffering salt or the like.

A polarizing element is dyed with iodine or a dichroic dye, and therefore, in order to prevent the recovered polymer from being colored with it, it is desirable that a reducing agent is added to the aqueous liquid so as to bleach the coloration with iodine or a dichroic dye. Not limited, the reducing agent to be used may be any one capable of bleaching it. Its examples are sodium thiosulfate, ascorbic acid, ferrous chloride. The amount of the reducing agent to be used is preferably from 0.1 to 100 g per kg of the aqueous liquid, more preferably from 1 to 20 g, even more preferably from 4 to 10 g.

Owing to the effect of the shear force to be mentioned hereinunder, it is desirable that the aqueous liquid may dissolve at least a part of the polarizing element in order to facilitate the separation of the first polymer film from the polarizing element. The polarizing element is generally formed of a polyvinyl alcohol (PVA)-type polymer film crosslinked with a crosslinking agent such as boric acid, or a polymer film of PVA having a high degree of saponification; and these may often hardly dissolve in an aqueous liquid. In such a case, a polyvinyl alcohol-decomposing enzyme having the ability to decompose polyvinyl alcohol-type polymer may be added to the aqueous liquid. The polyvinyl alcohol film peeled through treatment with an aqueous liquid may dissolve in the aqueous liquid or may swell therein, and when it is directly discharged as it is, then it may contaminate rivers, and therefore it is desirable to use an enzyme capable of decomposing polyvinyl alcohol-type polymer for waste treatment. As the polyvinyl alcohol decomposing enzyme, usable are those described in Yoshiharu Doi, et al's "Biodegradable Plastic Handbook", edited by the Society of Biodegradation Studies of Japan (issued by NTS), 7th Sec., Polyvinyl Alcohol Decomposing Enzymes (pp. 466-476). The condition suitable for decomposition of polyvinyl alcohol with a decomposing enzyme varies depending on the decomposing enzyme. The temperature may be set from 30 to 65° C., and the pH may be set from 6.5 to 9.0. The polyvinyl alcohol to be decomposed may include those having a high degree of polymerization to a low degree of polymerization, and those of complete saponification or having a low degree of saponification, and various polyvinyl alcohols in a broad range may be readily decomposed.

When a polarizing plate is processed with an aqueous liquid, a surfactant may be added to the aqueous liquid in order that the aqueous liquid may rapidly penetrate into the interface between the polymer film and the polarizing element. The surfactant may be selected from any of anionic, cationic, ampholytic and nonionic ones. Examples of the anionic surfactant include alkylcarboxylate salts, alkylsulfonate salts, alkylbenzenesulfonate salts, alkylnaphthalenesulfonate salts, alkylsulfate esters, alkylphosphate esters, N-acyl-N-alkyltaurines, sulfosuccinate esters, sulfoalkylpolyoxyethylene alkylphenyl ethers, polyoxyethylene alkylphosphate esters. Preferred are those having a carboxyl group, a sulfo group, a phospho group, a sulfate group or a phosphate group. Preferred examples of the cationic surfactant are alkylamine salts, aliphatic or aromatic quaternary ammonium salts, pyridinium, imidazolium and other heterocyclic quaternary ammonium salts, and aliphatic or hetero ring-containing phosphonium or sulfonium salts. Preferred examples of the ampholytic surfactant are amino acids, aminoalkylsulfonic acids, aminoalkyl sulfate or phosphate esters, alkylbetaines, amine oxides. Preferred examples of the nonionic surfactant are saponins (steroid-type), alkylene oxide derivatives (e.g., polyethylene glycol, polyethylene glycol/polypropylene glycol condensates, polyethylene glycol alkyl ethers or polyethylene glycol alkylaryl ethers, polyethylene glycol esters, polyethylene glycol sorbitan esters, polyalkylene glycol alkylamines or amides, silicone polyethylene oxide adducts), glycidol derivatives (e.g., alkenylsuccinic polyglycerides, alkylphenol polyglycerides), alkyl esters such as polyalcohol fatty acid esters.

When a polarizing plate is processed with an aqueous liquid, ultrasonic waves may be applied thereto for the purpose of promoting the separation of the polymer film from the polarizing element. The ultrasonic treatment may be attained while a polarizing plate is dipped in an aqueous liquid. The preferred range of the frequency and the power of the ultrasonic waves may vary depending on the size of the container used and the amount of the polarizing plate to be processed. In general, the frequency is preferably from 20 to 50 Hz, and the power is from 30 to 900 W or so.

Next, shear force is applied to the polarizing plate thus processed with an aqueous liquid. Preferably, after a polarizing plate is processed with an aqueous liquid, the shear force is applied before the protective films, the first and second polymer films are spontaneously peeled away from the polarizing element. By applying shear force thereto, any one of the first and second polymer films (in this, "first polymer film") is separated from the polarizing element. The shear force, by which the first polymer film can be separated from the polarizing element and the polarizing plate cannot be destroyed, may be applied to the polarizing plate. Concretely, the sharing force is preferably within the range from 1 N to 200 N per $cm^2$ of the area of the polarizing plate, more preferably from 5 to 100 N, even more preferably from 10 to 80 N. "Shear force" as referred to in this description means a force given to upper and lower protective films of a polarizing element plate in the direction parallel to the film face under being applied with forces having opposing vectors. According to the present invention, the treatment for applying the shear force to the polarizing plate is not specifically defined. For example, the polarizing plate to be processed may be conveyed while sandwiched between two rollers running at a different peripheral speed; or the polarizing plate to be processed is pulled so as to be wound up in the cross direction or in the upper direction while the edges of the first polymer film of the protective film on one side of the polarizing plate is held by clips. In that manner, the shear force may be applied to the polarizing plate in various methods.

The processed polarizing plate, from which the first polymer film has been removed, is further contacted with at least an aqueous liquid, whereby the second film may be separated from the polarizing element. The aqueous liquid to be used in this step may be the same or different from the above-mentioned aqueous liquid (for example, when it is a mixed liquid, the predetermined liquid compound mixed with it may differ, or its blend ratio may differ, or it may contain a different additive). Like in the above, the method for contacting the polarizing plate with the aqueous liquid is not also specifically defined, for which, various methods may be employed. During the treatment, the temperature of the aqueous liquid may be controlled. As mentioned in the above, it is desirable to add a reducing agent for bleaching, a surfactant and a PVA decomposing enzyme to the aqueous liquid to be used for separating the second polymer film from the polarizing element, and further, it is desirable to dip the polarizing plate in an aqueous liquid and ultrasonically treat it therein for promoting the separation.

The first and second polymer films separated from the polarizing element are recovered. The recovered polymer films are, if desired, further washed with an aqueous liquid, and then they may be recycled; or after dissolved in an organic solvent, and optionally purified, they may be used for various applications for polymer materials. When a polarizing plate having a primer layer, a hard coat layer and an antiglare layer formed on its surface is processed, then the hard coat layer and others may remain on the surface of the separated polymer films, not separated from it. In such a case, this may be dissolved in a desired solvent and separated from the primer layer, the hard coat layer and the antiglare layer, whereby the polymer film may be recycled as polymer. The conditions for the treatment may be referred to the description in the above-mentioned Japanese Laid-Open Patent Publication No. 2003-195048.

[Formation of Recycled Polymer Film]

Using the recovered polymer, a recycled polymer film may be produced. The recycled polymer film may be produced by melting the recovered polymer film or dissolving the recovered polymer film in a desired solvent, and forming the resulting melt or solution into a film. The film may be produced according to a method employing the solution such as a solvent-casting method and a coating method. The film may also be produced according to a method employing the melt such as a melt extrusion method. If desired, the solution and others may be purified through filtration or the like, and then used for production of recycled polymer films. The conditions for the above-mentioned various film formation methods are not specifically defined, and the films may be produced under ordinary conditions.

The first and second polymer films may be the same or different; however, the method of the invention is especially effective when directed to a polarizing plate in which the first and second polymer films differ at least in the moisture permeability thereof. Needless-to-say, even for a polarizing plate in which the first and second polymer films are of the same type (for example, TAC films), the method of the invention is also more effective as compared with any other conventional method, as it recovers the polymer film more rapidly.

The moisture permeability difference between the first and second polymer films is preferably at least 400 $g/m^2$, as facilitating the film separation, more preferably at least 600 $g/m^2$, even more preferably at least 1000 $g/m^2$.

For determination of the moisture permeability of a polymer film, employable are the methods described in "Physical Properties of Polymer II] (Polymer Experiment Lecture 4, Kyoritsu Publishing), pp. 285-294: Measurement of Water Vapor Penetration Amount (mass method, thermometer method, water vapor pressure method, adsorption method). Concretely, a film sample of 70 mmφ in size is moisturized at 60° C. and 95% RH for 24 hours, and then analyzed according to JIS Z-0208. The moisture permeability can be defined as follows:

Moisture permeability=(the mass of water content per the unit area ($g/m^2$) of the sample after moisturized)−(the mass of water content per the unit area ($g/m^2$) of the sample before moisturized).

Any of the first polymer film to be separated from the polarizing element owing to the effect of the shear force applied thereto, and the second polymer film to be thereafter separated from the polarizing element through the treatment in an aqueous liquid may have a relatively higher moisture permeability. Preferably, the moisture permeability of the polymer film having a relatively higher moisture permeability is from 1000 to 2000 $g/m^2$; and the moisture permeability of the polymer film having a relatively lower moisture permeability is preferably from 10 to 1000 $g/m^2$. However, the films are not limited to those ranges.

Examples of polymer films usable as the first and second polymer films are described below.

Cellulose Acylate Film:

A basic principle of a method for producing cellulose acylate is described in Migita et al's Wood Chemistry, pp. 180-190 (by Kyoritsu Publishing, 1968). One typical production method is a liquid-phase acetylation method with a carboxylic acid anhydride-acetic acid-sulfuric acid catalyst. Concretely, a cellulose material such as cotton linter or wood pulp is pretreated with a suitable amount of acetic acid, then put into a previously-cooled carboxylation mixture and esterified therein to give a complete cellulose acylate (the total degree of acyl substitution at 2-, 3- and 6-positions is nearly 3.00). The carboxylation mixture generally comprises acetic acid as a solvent, a carboxylic acid anhydride as an esterifying agent and sulfuric acid as a catalyst. The amount of the carboxylic acid anhydride is generally a stoichiometric excessive amount over the total of cellulose to react with it and water existing in the system. After the acylation, an aqueous solution of a neutralizing agent (e.g., calcium, magnesium, iron, aluminium or zinc carbonate, acetate or oxide) is added to the system for the purpose of hydrolyzing the excessive carboxylic acid anhydride remaining in the system and neutralizing a part of the esterifying agent therein. Next, the obtained complete cellulose acylate is saponified and ripened as kept at 50 to 90° C. in the presence of a small amount of an acetylation catalyst (in general, the residual acetic acid), whereby it is converted into a cellulose acylate having a desired degree of acyl substitution and a desired degree of polymerization. At the time when the desired cellulose acylate is obtained, the catalyst remaining in the system is completely neutralized with the above-mentioned neutralizing agent, or not neutralized, the cellulose acylate solution is put into water or diluted sulfuric acid (or water or diluted sulfuric acid is put into the cellulose acylate solution) to thereby separate through coagulation flocculation, wash and stabilize the cellulose acylate, and collect it.

The cellulose material for cellulose acylate includes cotton linter and wood pulp (hardwood pulp, softwood pulp), and cellulose acylate obtained from any such cellulose material may be used herein. Cellulose materials may be mixed for use herein. The details of these cellulose materials are described, for example, in Marusawa & Uda's "Plastic Material Lecture (17), Cellulosic Resin", Nikkan Kogyo Newspaper (1970), and Hatsumei Kyokai Disclosure Bulletin 2001-1745 (pp. 7-8). Cellulose materials described in these may be used herein with no specific limitation.

The degree of polymerization of the cellulose acylate is preferably from 180 to 700 in terms of the viscosity-average degree of polymerization thereof, more preferably from 180 to 550, even more preferably from 180 to 400, still more preferably from 180 to 350. When the degree of polymerization of cellulose acylate is too high, then the viscosity of the polymer dope may be too high, and if so, this may be disadvantageous in film formation through casting. On the other hand, when the degree of polymerization is too low, then the strength of the formed film may be low. The mean degree of polymerization may be measured according to an Uda et al's limiting viscosity method (Kazuo Uda, Hideo Saito, the Journal of Fiber Society of Japan, Vol. 18, No. 1, pp. 105-120, 1962). This is described in detail in JAPANESE LAID-OPEN PATENT PUBLICATION NO. 9-95538.

Regarding the molecular weight distribution of the cellulose acylate, it is desirable that the polydispersion index Mw/Mn (Mw is a mass-average molecular weight, Mn is a number-average molecular weight), as evaluated through gel permeation chromatography, of the polymer is small, and therefore the molecular weight distribution thereof is preferably smaller. Concretely, Mw/Mn of the polymer is preferably from 1.0 to 3.0, more preferably from 1.0 to 2.0, even more preferably from 1.0 to 1.6.

Of acetic acid and/or other fatty acids having from 3 to 22 carbon atoms that may substitute for the hydroxyl group in cellulose, the acyl group having from 2 to 22 carbon atoms may be an aliphatic group or an aryl group with no specific limitation, and it may be a single group or a mixture of two or more different groups. They are, for example, alkylcarbonyl esters, alkenylcarbonyl esters, aromatic carbonyl esters and aromatic alkylcarbonyl esters of cellulose, and may have a substituted group. Preferred examples of the acyl group are acetyl, propionyl, butanoyl, heptanoyl, hexanoyl, octanoyl, decanoyl, dodecanoyl, tridecanoyl, tetradecanoyl, hexadecanoyl, octadecanoyl, iso-butanoyl, t-butanoyl, cyclohexanecarbonyl, oleoyl, benzoyl, naphthylcarbonyl, and cinnamoyl groups. Of those, preferred are acetyl, propionyl, butanoyl, dodecanoyl, octadecanoyl, t-butanoyl, oleoyl, benzoyl, naphthylcarbonyl, cinnamoyl; and more preferred are acetyl, propionyl, butanoyl.

The cellulose acylate film (the term is used to include recycled cellulose acylate film) is preferably produced according to a solvent-casting process. The cellulose acylate dope to be used in the solvent-casting process preferably contain cellulose acylate in an amount of from 10 to 30% by mass dissolved in an organic solvent, more preferably from 13 to 27% by mass, even more preferably from 15 to 25% by mass. Regarding the method for preparing the dope having the desired cellulose acylate concentration within the range, the dope may have the desired concentration while it is prepared, or a low-concentration dope may be first prepared (for example, having a concentration of from 9 to 14% by mass), and then it may be concentrated into a high-concentration dope in the successive concentration step. Further, a high-concentration cellulose acylate dope may be first prepared, and various additives may be added thereto to thereby make the resulting cellulose acylate dope have a desired low concentration.

The prepared cellulose acylate dope is cast into a film on a steel belt or drum or on a substrate film (generally, a biaxially-oriented polyester film), and it is peeled away while it is semi-dried. Next, this is dried in a pin tenter drier or a roll-hanging drier, thereby giving a cellulose acylate film. If desired, a stretched film may also be used. Concretely, a dried film may be stretched between two pairs of rolls each running at a different peripheral speed, or may be stretched under heat and tension in an air-floating drier, whereby the film is stretched and this may be used as a protective film. For other film formation conditions and stretching conditions, referred to are those in conventional known methods.

Polycarbonate Film:

In general, polycarbonate is a generic term for those produced through polycondensation in which the main chains are bonded via carbonate bonding; but it may be used as a term that indicates those to be obtained through polycondensation of a bisphenol derivative and phosgene or diphenyl carbonate. In general, for a polycarbonate film, preferably used is an aromatic polycarbonate that comprises a repetitive unit of 2,2-bis(4-hydroxyphenyl)propane, referred to as bisphenol A, as the bisphenol component thereof, in view of the economical aspect and the physical properties of the film. Various bisphenol derivatives may be suitably selected to constitute different polycarbonate copolymers for use herein.

In addition to bisphenol A, the copolymerization component includes bis(4-hydroxyphenyl)methane, 1,1-bis(4-hydroxyphenyl)cyclohexane, 9,9-bis(4-hydroxyphenyl)fluorene, 1,1-bis(4-hydroxyphenyl)-3,3,5-trimethylcyclohexane, 2,2-bis(4-hydroxy-3-methylphenyl)propane, 2,2-bis(4-hydroxyphenyl)-2-phenylethane, 2,2-bis(4-hydroxyphenyl)-1,1,1,3,3,3-hexafluoropropane, bis(4-hydroxyphenyl)diphenylmethane, bis(4-hydroxyphenyl) sulfide, bis(4-hydroxyphenyl)sulfone. It further includes those in which the hydrogen atoms of the phenyl group are partly substituted with a methyl group or a halogen atom.

In addition, polyester carbonates are also usable herein, partially containing a component of terephthalic acid and/or isophthalic acid. Using these constitutive units as a part of the constitutive component of the polycarbonate that comprises bisphenol A may improve the properties, for example, the heat resistance or the solubility of the polycarbonate.

Regarding the molecular weight of the polycarbonate resin, in general, the viscosity-average molecular weight of the resin, as obtained through viscosity measurement in a methylene chloride solution having a concentration of 0.7 g/dL at 20° C., is preferably from 10,000 to 200,000, more preferably from 20,000 to 120,000. When a resin having a viscosity-average molecular weight of less than 10,000 is used, then the mechanical strength of the obtained film may be low; but when a resin having a high molecular weight of more than 200,000 is used, then the dope viscosity thereof may be too high and it may be problematic in its handlability.

The polycarbonate film (the term is used to include recycled polycarbonate film) is preferably produced according to a solvent-casting process. In preparing the polycarbonate dope to be used in the solvent-casting process, preferably used is a mixed solvent of a solvent consisting essentially of methylene chloride and a solvent consisting essentially of 1,3-dioxolane. Xylene may be one or more of p-xylene, o-xylene and m-xylene used singly or as combined. Polycarbonate is dissolved in the above mixed solvent to prepare a polycarbonate dope. The blend ratio of xylene is preferably from 0.1 to 2.0% by weight of the dope, more preferably from 1.0 to 1.3%. When the blend ratio of xylene to the dope is more than 2.0% by weight, then it is undesirable since the dope may be whitish. When the ratio is less than 0.1% by weight, then it is also undesirable since the optical properties of the cast film could not be unified when the film is monoaxially stretched. An example of the method for producing the polycarbonate dope is described. For example, when a 20% dope is prepared, polycarbonate may be dissolved in methylene chloride in the following manner. Methylene chloride is previously mixed with a small amount of xylene, then polycarbonate is put into it and stirred and dissolved therein at room temperature. In this step, the amount of xylene to be added to the dope is controlled to be from 0.1 to 2.0% by mass based of the dope.

For producing the thus-obtained polycarbonate dope into a polycarbonate film, referred to is the same film formation method as above for producing a cellulose acylate film from the above cellulose acylate dope.

Polyester Film:

The polyester resin to be used for polyester film formation is not specifically defined in point of its structure. Concretely, it includes polyethylene terephthalate, polyethylene naphthalate, polybutylene terephthalate, polybutylene naphthalate. Of those, preferred is polyethylene terephthalate from the viewpoint of the cost and the mechanical strength thereof. More preferred is a resin obtained through polycondensation of an aromatic dicarboxylic acid and an aliphatic diglycol.

The aromatic dicarboxylic acid includes isophthalic acid and 2,6-naphthalenedicarboxylic acid in addition to terephthalic acid; and their lower alkyl esters (anhydrides and other derivatives capable of forming esters such as lower alkyl esters) are also usable.

The aliphatic glycol includes ethylene glycol, propylene glycol, butanediol, neopentyl glycol, 1,4-cyclohexanedimethanol, diethylene glycol, p-xylylene glycol.

Of those, preferred is one comprising, as the essential ingredient thereof, polyethylene glycol obtained through reaction of terephthalic acid and ethylene glycol.

One comprising polyethylene terephthalate as the essential ingredient thereof is meant to include a copolymer in which the polyethylene terephthalate repetitive unit accounts for at least 80 mol %, or a blend polymer containing at least 80% by mass of polyethylene terephthalate.

An aromatic dicarboxylic acid having a group selected from sulfonic acid and its salt may be used for introducing a sulfonic acid group into the polyester, and it includes 5-sodium sulfoisophthalate, 2-sodium sulfoisophthalate, 4-sodium sulfoisophthalate, 4-sodium sulfo-2,6-naphthalenedicarboxylate or its ester-forming derivatives, and compounds derived from them by substituting sodium with any other metal (e.g., potassium, lithium).

Also usable are glycols with a group selected from sulfonic acid and its salt introduced thereinto; but the compounds that are preferably used for introducing a sulfonic acid group into the polyester are the above-mentioned aromatic dicarboxylic acids having a sulfonic acid group or its salt.

When the amount of the aromatic dicarboxylic acid component having a sulfonic acid group or its salt is more than 10 mol % of all the aromatic dicarboxylic acid component used in the polymer production, then the stretchability and the mechanical strength of the produced polymer may poor; but when it is less than 1 mol %, then the polymer could not have good driability.

The polyester for use in forming the polyester film may be copolymerized with any other component, or may be mixed with any other polymer.

Other aromatic dicarboxylic acids and their derivatives than the above usable herein are aromatic dicarboxylic acids such as 2,7-naphthalenedicarboxylic acid, 1,5-naphthalenedicarboxylic acid, diphenyldicarboxylic acid, diphenyletherdicarboxylic acid, and their lower alkyl esters (anhydrides and other derivatives capable of forming esters such as lower alkyl esters). In the polymer production, also usable are alicyclic dicarboxylic acids such as cyclopropanedicarboxylic acid, cyclobutanedicarboxylic acid and hexahydroterephthalic acid, and their derivatives (anhydrides and other derivatives capable of forming esters such as lower alkyl esters), aliphatic dicarboxylic acids such as adipic acid, succinic acid, oxalic acid, azelaic acid, sebacic acid and dimer acid, and their derivatives (anhydrides and other derivatives capable of forming esters such as lower alkyl esters), in an amount of at most 10 mol % of all the dicarboxylic acid component to be used.

Glycols usable herein include, in addition to ethylene glycol and the above-mentioned glycols, trimethylene glycol, triethylene glycol, tetramethylene glycol, hexamethylene glycol, neopentyl glycol, bisphenol A, p,p'-dihydroxyphenyl sulfone, 1,4-bis(β-hydroxyethoxyphenyl)propane, polyalkylene (e.g., ethylene, propylene) glycol, and p-phenylenebis (dimethylolcyclohexane). These may be used in an amount of at most 10 mol % of all the glycol component to be used.

The polyester to be used in forming the polyester film may be blocked at its terminal hydroxyl group and/or carboxyl group with a monofunctional compound such as benzoic acid, benzoylbenzoic acid, benzyloxybenzoic acid, methoxypolyalkylene glycol; or may be modified with an extremely small amount of a trifunctional or tetrafunctional ester-forming compound such as glycerin or pentaerythritol within a range within which the modification may give a substantially linear copolymer.

The polyester film usable in the invention may be formed of a polyester copolymerized with a bisphenol compound or a compound having a naphthalene ring or a cyclohexane ring; and the film of the type has improved heat resistance.

The polyester film (the term is used to include recycled polyester film) is preferably formed in a mode of melt extrusion; and also preferably, the unstretched film thus formed through melt extrusion is biaxially stretched to be the film for use herein. A method for producing a polyester film through melt extrusion combined with biaxially stretching treatment is described below, to which, however, the invention should not be limited. In the following description, the machine direction means the film-traveling direction (lengthwise direction) of the film; and the cross direction means the direction perpendicular to the film-traveling direction.

A polyester material is first shaped into pellets, then dried with hot air or in vacuum, and melt-extruded through a T-die into a sheet, which is then airtightly stuck to a cooling drum according to an electrostatic charging method, cooled and solidified thereon to give an unstretched sheet. Next, the thus-obtained unstretched sheet is heated up to a temperature within a range of the glass transition temperature (Tg) of the polyester to Tg+100° C., via plural rolls and/or a heating device such as IR heater, and is thus stretched in one stage or in multiple stages. Next, the thus-obtained, machine direction-stretched polyester film is stretched in the cross direction and then thermally fixed at a temperature falling within a temperature range of from Tg to Tm (melting point). The thermally-fixed film is generally cooled to Tg or lower, and then the clipped edges of the film are both trimmed away and the film is wound up. In this stage, the film is preferably relaxed by from 0.1 to 10% in the cross direction and/or the machine direction at a temperature falling within a temperature range of not lower than Tg. The cooling and relaxation method is not specifically defined, and may be any known one; but preferably, the film subjected to the treatment while successively cooled in different temperature ranges, from the viewpoint of improving the dimensional stability of the film.

In the manner as above, a biaxially-stretched polyester film may be obtained. In the biaxially-stretched polyester film, molecular alignment is well attained, and therefore the film may have an extremely excellent mechanical strength. The draw ratio in stretching is not specifically defined; however, the draw ratio in one direction is preferably from 1.5 to 7 times, more preferably from 2 to 5 times or so. In particular, a biaxially-stretched film for which the monoaxial draw ratio is from 2 to 5 times or so may have an extremely excellent mechanical strength since the molecular alignment therein is more effective and is more effectively controlled, and therefore the film of the type is favorable for the invention. However, in case where the draw ration is smaller than 1.5 times, the film could not have a sufficient mechanical strength. On the other hand, in case where the draw ratio is more than 7 times, the film could hardly have a uniform thickness; and such cases are problematic.

The optimum conditions for the thermal fixation, cooling and relaxation treatment varies depending on the polyester that constitutes the film, and therefore, the conditions may be suitably determined by measuring the physical properties of the obtained stretched films and selecting the conditions under which the films could have preferred characteristics.

Cyclic Polyolefin Film:

"Cyclic polyolefin resin" in this description means a polymer resin having a cyclic polyolefin structure. In this description, the cyclic polyolefin resin may be referred to as cyclic polyolefin.

Examples of the polymer resin having a cyclic olefin structure for use in forming films include (1) norbornene polymers, (2) monocyclic olefin polymers, (3) cyclic conjugated diene polymers, (4) vinyl alicyclic hydrocarbon polymers, and hydrides of (1) to (4). Of those, preferred are addition-(co)polymerized cyclic polyolefins containing at least one repetitive unit of the following general formula (II), and addition-copolymerized cyclic polyolefins optionally further containing at least one repetitive unit of the following general formula (I). Also preferably usable herein are ring-cleavage (co)polymers containing at least one cyclic repetitive unit of the following general formula (III).

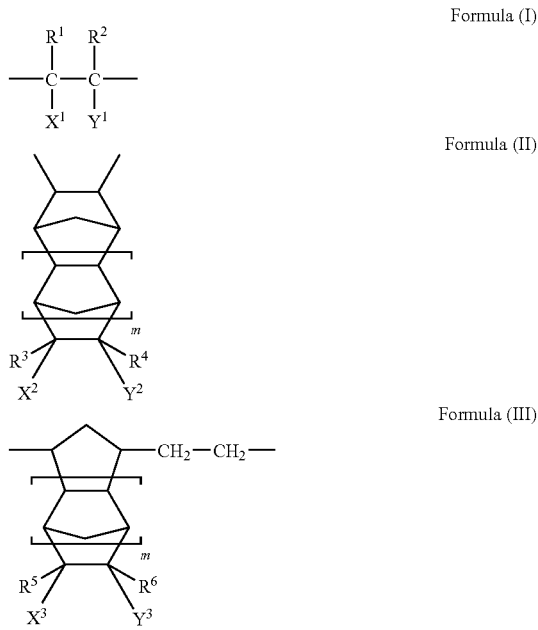

In the formulae, m indicates an integer of from 0 to 4. $R^1$ to $R^6$ each represent a hydrogen atom or a hydrocarbon group having from 1 to 10 carbon atoms; $X^1$ to $X^3$ and $Y^1$ to $Y^3$ each represent a hydrogen atom, a hydrocarbon group having from 1 to 10 carbon atoms, a halogen atom, a hydrocarbon group having from 1 to 10 carbon atoms and substituted with a halogen atom, or —$(CH_2)_n COOR^{11}$, —$(CH_2)_n OCOR^{12}$, —$(CH_2)_n NCO$, —$(CH_2)_n NO_2$, —$(CH_2)_n CN$, —$(CH_2)_n CONR^{13}R^{14}$, —$(CH_2)_n NR^{13}R^{14}$, —$(CH_2)_n OZ$ or —$(CH_2)_n W$, or $X^1$ and $Y^1$ or $X^2$ and $Y^2$ or $X^3$ and $Y^3$ may form (—$CO)_2O$ or (—$CO)_2NR^{15}$. $R^{11}$, $R^{12}$, $R^{13}$, $R^{14}$ and $R^{15}$ each represent a hydrogen atom, or a hydrocarbon group having from 1 to 20 carbon atoms; Z represents a hydrocarbon group or a hydrocarbon group substituted with a halogen atom; W represents $SiR^{16}_p D_{3-p}$ ($R^{16}$ represents a hydrocarbon group having from 1 to 10 carbon atoms; D represents a halogen atom, —$OCOR^{16}$ or —$OR^{16}$; p indicates an integer of from 0 to 3); and n indicates an integer of from 0 to 10.

Introducing a functional group having a large polarity into the substituent of $X^1$ to $X^3$ and $Y^1$ to $Y^3$ may increase the thickness-direction retardation (Rth) of the optical film and may increase the expressibility of the in-plane retardation (Re) thereof. The film having a large Re expressibility may have a large Re when it is stretched during its formation.

Norbornene addition-(co)polymers are disclosed in Japanese Laid-Open Patent Publication No. 10-7732, Japanese translation of PCT international application No. 2002-504184, US Patent Publication No. 2004229157A1 and WO2004/070463A1. They may be obtained through addition polymerization of norbornene-type polycyclic unsaturated compounds. If desired, norbornene-type polycyclic unsaturated compounds may be addition-polymerized with conjugated dienes such as ethylene, propylene, butene, butadiene, isoprene; non-conjugated dienes such as ethylidene norbornene; linear diene compounds such as acrylonitrile, acrylic acid, methacrylic acid, maleic anhydride, acrylate, methacrylate, maleimide, vinyl acetate, vinyl chloride. Such norbornene addition-(co)polymers are sold by Mitsui Chemical as a trade name of Apel series, including, for example, various grades of APL8008T (Tg 70° C.), APL6013T (Tg 125° C.) and APL6015T (Tg 145° C.) having a different glass transition temperature (Tg). Pellets of such polymers are sold by Polyplastic as TOPAS8007, 6013, 6015. Further, Appear3000 is sold by Ferrania.

As disclosed in Japanese Laid-Open Patent Publication Nos. 1-240517, 7-196736, 60-26024, 62-19801, 2003-1159769, 2004-309979, norbornene polymer hydrides may be produced through addition polymerization or metathesis ring-cleavage polymerization of polycyclic unsaturated compounds followed by hydrogenation. Of the above-mentioned norbornene polymers, preferred are those where $R^5$ and $R^6$ each are a hydrogen atom or —$CH_3$, $X^3$ and $Y^3$ each are a hydrogen atom, Cl or —$COOCH_3$, and the other groups may be suitably selected. The norbornene polymers of those types are sold by JSR as trade names of ARTON G or ARTON F, and by Nippon Zeon as trade names of ZEONOR ZF14, ZF16, ZEONEX 250, 280, and these may be used herein.

Preferably, the cyclic polyolefin film (the term is used to include recycled cyclic polyolefin film) is formed according to a solution film formation method or a melt film formation method.

The first and second polymer films are not limited to the above-mentioned examples of polymer films, and may be selected from various films of polymers having excellent transparency, mechanical strength, thermal stability and moisture shieldability. Examples of such a film include films of acrylic polymers such as polymethyl methacrylate; and those of styrene polymers such as polystyrene, acrylonitrile-styrene copolymer (AS resin). In addition, also usable are films of polyolefin polymers such as polyethylene, polypropylene, polyolefin, ethylene/propylene copolymer; vinyl chloride polymers; amide polymers such as nylon, aromatic polyamide; imide polymers, sulfone polymers, polyether sulfone polymers, polyether ether ketone polymers, polyphenylene sulfide polymers, vinyl alcohol polymers, vinylidene chloride polymers, vinyl butyral polymers, arylate polymers, polyoxymethylene polymers, epoxy polymers; and blends of those polymers. The first and second polymer films may also be selected from cured layers of thermosetting acrylic, urethane, acrylurethane, epoxy or silicone resins or UV-curable resins.

[Formation of Polarizing Plate]

The recycled polymer films formed herein may be used in various applications. The recycled first and second polymer films may be stuck to the surfaces of a polarizing element, thereby constructing a polarizing plate.

Not specifically defined, various types of polarizing elements may be used. The polarizing elements include, for example, those produced by applying a dichroic substance such as iodine or dichroic dye to a hydrophilic polymer film, such as polyvinyl alcohol film, partially-formalized polyvinyl alcohol film or partially-saponified ethylene/vinyl acetate copolymer film, so as to make the film adsorb the substance, followed by monoaxially stretching the film; and oriented films of polyenes such as dehydrated polyvinyl alcohol or dehydrochlorination-processed polyvinyl chloride. Of those, preferred are polarizing elements comprising a polyvinyl alcohol film and a dichroic substance such as iodine. Not specifically defined, the thickness of the polarizing element may be generally from 5 to 80 µm or so.

The monoaxially-stretched polarizing element of polyvinyl alcohol film dyed with iodine may be produced, for example, by dipping a polyvinyl alcohol film in an aqueous solution of iodine and then stretching it by from 3 to 7 times the original length. If desired, the film may be dipped in an aqueous solution of potassium iodide optionally containing boric acid, zinc sulfate, zinc chloride or the like. Further if desired, the polyvinyl alcohol film may be dipped in and washed with water before dyed. Washing the polyvinyl alcohol film with water may be effective for removing the surface dirt or the blocking inhibitor from the film, and for swelling the film to thereby prevent uneven treatment such as uneven dyeing of the film. The film may be stretched after dyed with iodine or during dyeing with it, or it may be dyed with iodine after stretched. The film may be stretched in an aqueous solution of boric acid or potassium iodide, or in a water bath.

The treatment for sticking the polarizing element and the recycled polymer films is not specifically defined. For it, for example, usable are an isocyanate adhesive, a polyvinyl alcohol adhesive, a gelatin adhesive, a vinyl latex, a water-base polyester, etc. The polyvinyl alcohol adhesive may contain boric acid, borax, glutaraldehyde, melamine, a water-soluble crosslinking agent such as oxalic acid. The primer layer may be formed as a dried coating layer of an aqueous solution. In preparing the aqueous solution, if desired, any other additive and catalyst such as acid may be added to it.

The adhesive may be a polyvinyl alcohol resin having an acetoacetyl group.

The polyvinyl alcohol resin includes polyvinyl alcohol obtained through saponification of polyvinyl acetate; its derivative; saponified copolymer of vinyl acetate and monomer capable of copolymerizing it; and modified polyvinyl alcohol obtained through acetalization, urethanation, etherification, grafting or phosphorylation of polyvinyl alcohol. The monomer includes unsaturated carboxylic acids such as maleic acid (anhydride), fumaric acid, crotonic acid, itaconic acid, (meth)acrylic acid, and their esters; α-olefins such as ethylene, propylene; (meth)allylsulfonic acid (its sodium salt), sodium sulfonate (its monoalkyl maleates), sodium disulfonate alkyl maleates, N-methylolacrylamide, alkali acrylamidealkylsulfonates, N-vinylpyrrolidone, N-vinylpyrrolidone derivatives. One or more such polyvinyl alcohol resins may be used either singly or as combined.

Not specifically defined, the polyvinyl alcohol resin may have a mean degree of polymerization of from 100 to 3000 or so, preferably from 500 to 3000, and a mean degree of saponification of from 85 to 100 mol % or so, preferably from 90 to 100 mol % from the viewpoint of its adhesiveness.

For improving the adhesion between the recycled polymer film and the polarizing element, the surface of the recycled polymer film may be subjected to surface treatment such as saponification treatment, corona discharge treatment or glow discharge treatment.

Regarding the polarizing element and the recycled polymer film (especially recycled polymer film except cellulose acylate film), it is desirable to form a primer layer (first undercoat layer) between the polarizing element and the recycled polymer film for further improving the adhesion therebetween. The primer layer is preferably formed of an acrylate latex, a methacrylic latex or a styrene latex. The latex may be a copolymer latex obtained through emulsion polymerization of a monomer mixture comprising (a) a diolefin monomer, (b) a vinyl monomer and (c) at least one monomer having at least two vinyl, acryloyl, methacryloyl or allyl group in the molecule, in the presence of a polymerization chain transfer agent comprising (d) an α-methylstyrene dimer and any other polymerization chain transfer agent, in an aqueous medium.

Examples of the diolefin monomer (a) include conjugated dienes such as butadiene, isoprene, chloroprene. Of those, preferably used is butadiene. The vinyl monomer (b) may be any one having a vinyl group, and its preferred examples are styrene, acrylonitrile, methyl methacrylate, vinyl chloride and their derivatives, alkyl acrylates, acrylamide, methacrylamide, acrolein, methacrolein, glycidyl acrylate, glycidyl methacrylate, 2-hydroxyethyl acrylate, 2-hydroxyethyl methacrylate, allyl acrylate, allyl methacrylate, N-methylolated acrylamide, N-methylolated methacrylamide, vinyl isocyanate, allyl isocyanate. The styrene derivatives are, for example, methylstyrene, dimethylstyrene, ethylstyrene, diethylstyrene, isopropylstyrene, butylstyrene, hexylstyrene, cyclohexylstyrene, decylstyrene, benzylstyrene, chloromethylstyrene, trifluoromethylstyrene, ethoxymethylstyrene, acetoxymethylstyrene, methoxystyrene, 4-methoxy-3-methylstyrene, dimethoxystyrene, chlorostyrene, dichlorostyrene, trichlorostyrene, tetrachlorostyrene, pentachlorostyrene, bromostyrene, dibromostyrene, iodostyrene, fluorostyrene, trifluorostyrene, 2-bromo-4-trifluoromethylstyrene, 4-fluoro-3-trifluoromethylstyrene, methyl vinylbenzoate. Preferred examples of acrylates are ethyl acrylate, glycidyl (meth)acrylate, 2-hydroxyethyl (meth)acrylate.

The monomer (c) having at least two vinyl, acryloyl, methacryloyl or allyl groups in the molecule may be an ordinary crosslinking agent to be added in polymerization of vinyl monomer, for example, divinylbenzene, 1,5-hexadiene-3-yne, hexatriene, divinyl ether, divinyl sulfone, diallyl phthalate, diallyl carbinol, diethylene glycol dimethacrylate, trimethylolpropane trimethacrylate, trimethylolpropane dimethacrylate.

Preferably, the content of the diolefin monomer (a) in the above copolymer is from 10 to 60% by mass of the entire copolymer, more preferably from 15 to 40% by mass. The content of the vinyl monomer (b) may be from 40 to 90% by mass of the entire copolymer; and when the vinyl monomer is a styrene compound, its content is preferably from 40 to 70% by mass of the entire copolymer. Preferably, the content of the monomer (c) having at least two vinyl, acryloyl, methacryloyl or allyl groups in the molecule is preferably from 0.01 to 10% by mass of the total of the diolefin monomer (a) and the vinyl monomer (b), more preferably from 0.1 to 5% by mass.

α-methylstyrene dimer, a type of the polymerization chain transfer agent (d) includes three isomers, (i) 2,4-diphenyl-4-methyl-1-pentene, (ii) 2,4-diphenyl-4-methyl-2-pentene, (iii) 1,1,3-trimethyl-3-phenylindane. A preferred composition of α-methylstyrene dimer is comprised of at least 40% by mass of the isomer (i) and at most 60% by mass of the isomer (ii) and/or the isomer (iii), more preferably at least 50% by mass of the isomer (i) and at most 50% by mass of the isomer (ii) and the isomer (iii), even more preferably at least 70% by mass of the isomer (i) and at most 30% by mass of the isomer (ii) and/or the isomer (iii). With the increase in the blend ratio of the isomer (i), the composition may have a more excellent chain transfer effect. Not detracting from the object of the invention, α-methylstyrene dimer may contain impurities, for example, unreacted α-methylstyrene, and any other α-methylstyrene oligomer and α-methylstyrene polymer than the above-mentioned isomers (i), (ii) and (iii). In its use, α-methylstyrene dimer may be directly used as it is, not purified after its production, so far as it does not detract from its object.

The proportion of α-methylstyrene dimer in the polymerization chain transfer agent (d) may be from 2 to 100% by mass, preferably from 3 to 100% by mass, even more preferably from 5 to 95% by mass. When the proportion of α-methylstyrene dimer is less than 2% by mass, then a copolymer latex having excellent adhesion strength and blocking resistance and could not be obtained. Combined with any other polymerization chain transfer agent, the reactivity of α-methylstyrene dimer in polymerization may be increased.

The amount of the polymerization chain transfer agent (d) to be used may be from 0.3 to 10 parts by mass per 100 parts by mass of the monomer mixture, preferably from 0.5 to 7 parts by mass. When the amount of the polymerization chain transfer agent (d) is less than 0.3 parts by mass, then it is unfavorable since the blocking resistance of the polymer may be poor; but on the other hand, when the amount of more than 10 parts by mass, then it is also unfavorable since the adhesion strength of the polymer may be poor. The amount of α-methylstyrene dimer to be sued may be from 0.1 to 5 parts by mas per 100 parts by mass of the monomer mixture.

The other chain transfer agent that may be combined with α-methylstyrene dimer in the polymerization chain transfer agent (d) may be any known polymerization chain transfer agent generally used in ordinary emulsion polymerization. Concretely, it includes, for example, mercaptans such as octylmercaptan, n-dodecylmercaptan, t-dodecylmercaptan, n-hexadecylmercaptan, n-tetradecylmercaptan, t-tetradecylmercaptan; xanthogene disulfides such as dimethylxanthogene disulfide, diethylxanthogene disulfide, diisopropylxanthogene disulfide; thiuram disulfides such as tetramethylthiuram disulfide, tetraethylthiuram disulfide, tetrabutylthiuram disulfide; carbon tetrachloride; halogenohydrocarbons such as ethylene bromide; hydrocarbons such as pentaphenylethane; and acrolein, methacrolein, allyl alcohol, 2-ethylhexyl thioglycolate, terpinolene, α-terpinene, γ-terpinene, dipentene. One or more of these may be used herein, either singly or as combined. Of those, preferred are mercaptans, xanthogene disulfides, thiuram disulfides, carbon tetrachloride.

The copolymer latex usable in forming the primer layer may be produced through known emulsion polymerization except that the above-mentioned monomer mixture and polymerization chain transfer agents are used. Specifically, a monomer mixture, a polymerization initiator, a emulsifier, and a polymerization chain transfer agent are added to an aqueous medium such as water, and polymerized in a mode of emulsion polymerization to produce the intended copolymer latex.

The primer layer may be formed by applying the copolymer latex to the surface of a recycled polymer film, and in general, it is formed as an undercoat layer. Not specifically defined, the thickness of the primer layer is preferably from 50 to 1000 nm, more preferably from 50 to 300 nm, even more preferably from 50 nm to 200 nm.

In forming the primer layer, the copolymer latex is preferably combined with a dichloro-s-triazine crosslinking agent. Combined with a dichloro-s-triazine crosslinking agent, the copolymer latex may have an extremely increased adhesive power under normal humidity condition, high humidity condition and low humidity condition, and the layer formed of it is not cracked under low humidity condition; and in addition, the layer may have excellent antistatic property, scratch resistance, water resistance and solvent resistance. The dichloro-s-triazine crosslinking agent usable herein includes compounds of the following general formula (2) or (3):

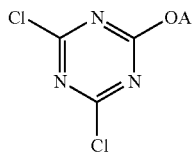

Formula (2)

In formula (2), "A" represents an alkyl group, a cycloalkyl group, an aryl group, an aralkyl group, a metal atom or a hydrogen atom.

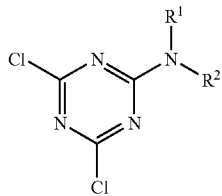

Formula (3)

In formula (3), $R^1$ and $R^2$ respectively represent a hydrogen atom, an alkyl group, a cycloalkyl group, an aryl group, an aralkyl group, or —$NHR^3$ ($R^3$ represents an alkyl group, or an acyl group); $R^1$ and $R^2$ may bond to each other, and may form a 5- or 6-membered ring containing any of O, S and N—$R^4$ ($R^4$ represents an alkyl group).

Preferably, the dichloro-s-triazine crosslinking agent is added in an amount of from 0.1 to 100 parts by mass of the monomer mixture. When the amount of the dichloro-s-triazine crosslinking agent is less than 0.1 parts by mass, then the increase in the adhesion power of the layer may be insufficient, and, in addition, the cracking resistance of the layer under low humidity condition, as well as the antistatic property, the scratch resistance, the water resistance and the solvent resistance of the layer may be poor. On the other hand, when the amount of the dichloro-s-triazine crosslinking agent is more than 100 parts by mass, then it is also unfavorable since a large amount of the unreacted crosslinking agent may remain and it may move into the upper gelatin layer to form an overcured film, and in addition, it may lower the adhesiveness to the overlying emulsion layer or backing layer.

Examples of the dichloro-s-triazine crosslinking agent are mentioned below.

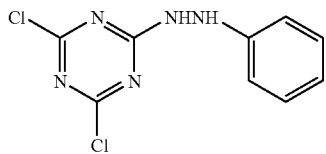

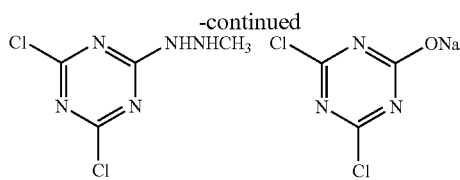

-continued

For the purpose of increasing the adhesiveness between the polarizing element and the recycled polymer film, a second undercoat layer comprising a hydrophilic polymer as the main binder therein may be formed on the primer layer.

The hydrophilic polymer for use in the layer includes synthetic or natural hydrophilic polymer compounds, for example, gelatin; acylated gelatin such as phthalated gelatin, maleated gelatin; cellulose derivatives such as carboxymethyl cellulose, hydroxyethyl cellulose; grafted gelatin produced by grafting gelatin with acrylic acid, methacrylic acid or amide; polyvinyl alcohol, polyhydroxyalkyl acrylate, polyvinyl pyrrolidone, copoly-vinylpyrrolidone/vinyl acetate, casein, agarose, albumin, sodium alginate, polysaccharide, agar, starch, grafted starch, polyacrylamide; homo or copolymers of N-substituted acrylamide, N-substituted methacrylamide; and their partial hydrolyzates. One or more of these may be used herein either singly or as combined. Gelatin and its derivatives are preferred for the hydrophilic polymer.

The first undercoat layer, or that is, the primer layer, and the second undercoat layer may be formed according to well-known coating methods, for example, a dipping method, an air knife coating method, a curtain coating method, a roller coating method, a wire bar coating method, a gravure coating method, or an extrusion method using a hopper as in U.S. Pat. No. 2,681,294.

The thickness of the second undercoat layer is preferably from 0.05 to 1.0 µm. When it is thinner than 0.05 µm, then the layer could not exhibit sufficient adhesiveness; but when thicker than 1.0 µm, then the adhesiveness of the layer may be saturated.

After the recycled polymer film is laminated on one or both surfaces of a polarizing element to construct a polarizing plate, a functional layer such as a primer layer, a hard coat layer or an antiglare layer may be formed on one or both surfaces of the polarizing plate. The adhesive to be used in forming the primer layer is not specifically defined. For example, it may be suitably selected from those comprising, as the base polymer component thereof, an acrylic polymer, a silicone polymer, a polyester, a polyurethane, a polyamide, a polyether, a fluoropolymer or a rubber polymer. Especially preferred are those having excellent optical transparency and having good adhesive characteristics such as suitable wettability, coagulability and adhesiveness, and also having excellent weather resistance and heat resistance, such as acrylic adhesives. Preferably, the primer layer is formed of an adhesive having a gel fraction of at least 70%. The gel fraction is more preferably at least 75%, even more preferably at least 80%. The materials of the antiglare layer and the hard coat layer are not also specifically defined. Preferably, the curing ratio of the hard coat layer and the antiglare layer is at least 70%, more preferably at least 75%, even more preferably at least 80%. When the layers have a gel fraction and a curing ratio as in the above ranges, then the recycled polymer layer in the polarizing plate may be readily recycled. Concretely, the recycled polymer layer peeled from the polarizing element may dissolve in a solvent, in which the adhesive, the hard coat layer and the antiglare layer may be individually separated from each other, and they may be again reused for recycled polymer films. For the conditions in dissolving the layer in a solvent, referred to are the methods described in Patent Reference 2, as so mentioned hereinabove.

The method of recovery of polymer film, the method of production of recycled polymer film and the method of production of polarizing plate may be carried out separately, or two or more of them may be carried out continuously. The polarizing plate to be processed according to the polymer film recovery method of the invention includes wastes in polarizing plate production, for example, trimmings and failed polarizing plates such as those failed in lamination, and also includes used polarizing plates.

EXAMPLES

The invention is described in detail with reference to the following Examples and Comparative Examples, which, however, are not intended to restrict the scope of the invention.

[Formation of Polarizing Plate 1]

Formation of Polymer Film 1 (TAC Film):

A triacetyl cellulose film (Fuji Photo Film's TD80) having a thickness of 80 μm was dipped in a aqueous sodium hydroxide solution having a concentration of 5% at 40° C. for 2 minutes, then rinsed with pure water at 30° C. for 1 minute, and dried at 100° C. for 2 minutes for saponification to be a TAC film (Polymer Film 1) for use herein.

Formation of Polymer Film 2 (PET Film):

Polyethylene terephthalate (PET) produced in an ordinary method was formed into chips, then dried in a Henschel mixer and a paddle drier to have a water content of at most 50 ppm, and thereafter melted in an extruder in which the heater temperature was set at 280 to 300° C. The polyester resin melt was extruded out through the die onto an electrostatically-charged chiller roll to obtain an amorphous base. The amorphous base was stretched in the base traveling direction to a draw ratio of 3.3 times, then stretched in the cross direction of the base to a draw ratio of 3.9 times, thereby producing a PET film (Polymer Film 2) having a thickness of 100 μm.

The surface of the PET film to which a polarizing element is to be stuck was processed for corona discharge treatment, and then a coating liquid SS1 mentioned below was applied onto it to have a dry film thickness of 90 nm, thereby forming a first undercoat layer.

| Coating Liquid SS1 | |
|---|---|
| Styrene-Butadiene Latex (solid content 43%) | 300 g |
| 2,4-Dichloro-6-hydroxy-s-triazine sodium salt (8%) | 49 g |
| Distilled Water | 1600 g |

After the first undercoat layer was thus formed, its surface was processed for corona discharge treatment, and then a coating liquid SS2 mentioned below was applied onto it to have a dry film thickness of 100 nm, thereby forming a second undercoat layer.

| Coating Liquid SS2 | |
|---|---|
| Gelatin | 30 g |
| Acetic Acid (20%) | 20 g |
| Distilled Water | 1900 g |

The PET film having the first and second undercoat layers was used as a polymer film 2.

Formation of Polarizing Element:

A polyvinyl alcohol film having a thickness of 120 μm was dipped in an aqueous solution containing 1 part by mass of iodine, 2 parts by mass of potassium iodide and 4 parts by mass of boric acid, and stretched at 50° C. by 4 times to produce a polarizing element.

Formation of Polarizing Plate 1:

The saponified surface of the TAC film (Polymer Film 1) and the surface of the second undercoat layer of the PET film (Polymer Film 2) were stuck to the surfaces of the polarizing element, using an aqueous, 5% completely-saponified polyvinyl alcohol solution as an adhesive, thereby producing a polarizing plate (Polarizing Plate 1).

[Formation of Polarizing Plate Nos. 2 to 4]

Polarizing plates were produced in the same manner as that for the polarizing plate 1, for which, however, polymer films shown in Table 1 below were used in the place of the PET film as Polymer Film 2.

TABLE 1

| | Protective Films of Polarizing plate | | | | |
|---|---|---|---|---|---|
| | Polymer Film 1 | | | Polymer Film 2 | |
| | Type | moisture permeability g/m$^2$ | primer layer (*) | type | moisture permeability g/m$^2$ | primer layer |
| Polarizing plate 1 | TAC | 1400 | no | PET | 60 | yes |
| Polarizing plate 2 | TAC | 1400 | no | ZEONOR | 5 | yes |
| Polarizing plate 3 | TAC | 1400 | no | ARTON | 200 | yes |
| Polarizing plate 4 | TAC | 1400 | no | TAC | 1400 | no |

(*) The adhesive surface of TAC was all saponified.

Example 1

Polarizing plate 1 was pulverized with a grinder into chips, dipped in an aqueous liquid of 100 times by weight of the polarizing plate, then heated and stirred for a predetermined period of time under the condition shown in Table 2 below, and thereafter the chips were sandwiched between two rollers running at a different peripheral speed to thereby give them shear force of 100 N per cm$^2$ of the polarizing plate, and the PET film (Polymer Film 2) was first separated from the polarizing element. Further, the sample from which the polymer film 2 was removed was dipped in an aqueous liquid for 30 minutes to separate the TAC film (Polymer Film 1). The recovered TAC film and PET film were separated from each other. It was confirmed that the recovered TAC film could be dissolved in methylene chloride, then filtered and again cast for film formation into a recycled TAC film, that the recovered PET film could also be melted and formed into a recycled PET film, and that the recycled TAC film and PET film could have sufficient properties as polarizing plate-protective film.

Examples 2 to 6

In the same manner as in Example 1, the films were separated under the condition shown in Table 2; and it was confirmed that recycled polymer films could be produced from the recovered polymer films and that the recycled polymer films could be used as polarizing plate-protective film.

Example 7

It was confirmed that, also in Polarizing plate 4 having TAC films as protective films on its both surfaces, the TAC films could be separated and recovered at a higher speed by giving shear force thereto, as compared with a process not including a step of applying shear force to the sample.

Comparative Examples 1 to 3

Not applying shear force thereto, recovery of the polymer films was tried under the condition in Table 2. However, the polymer films (Polymer Film 1 and Polymer Film 2) could not be separated and could not be recycled.

Comparative Examples 4 to 6

The polarizing plate was dissolved in a non-aqueous solvent under the condition in Table 2, and recovery of the polymer films was tried. However, both the polymer films (Polymer Film 1 and Polymer Film 2) dissolved, and could not be separated from each other.

The results are shown in Table 2 below. The tested samples were evaluated according to the criteria mentioned below.

[Evaluation]

<Separability>
A: Polymer Film 1 and Polymer Film 2 were separated, not almost mixed together.
B: Polymer Film 1 and Polymer Film 2 were separated at a purity of at least 90%.
C: Polymer Film 1 and Polymer Film 2 mixed together.

TABLE 2

| Example No. | Polarizing plate Sample | Composition of Aqueous Liquid | | Temperature (° C.) | Time (min) | Shear Force (N/cm$^2$) | Separability |
|---|---|---|---|---|---|---|---|
| | | Type | blend ratio | | | | |
| Example 1 | Polarizing plate 1 | Water | 100 | 60 | 30 | 100 | A |
| Example 2 | Polarizing plate 2 | Water | 100 | 60 | 30 | 10 | A |
| Example 3 | Polarizing plate 3 | Water | 100 | 60 | 30 | 10 | A |
| Example 4 | Polarizing plate 2 | water/ethanol | 90/10 | 60 | 10 | 10 | A |
| Example 5 | Polarizing plate 2 | Water | 100 | 60 | 50 | 1 | B |
| Example 6 | Polarizing plate 2 | Water | 100 | 60 | 40 | 5 | B |
| Example 7 | Polarizing plate 4 | Water | 100 | 60 | 20 | 5 | A |
| Comparative Example 1 | Polarizing plate 1 | Water | 100 | 60 | 60 | no | C |
| Comparative Example 2 | Polarizing plate 2 | Water | 100 | 60 | 60 | no | C |
| Comparative Example 3 | Polarizing plate 3 | Water | 100 | 60 | 60 | no | C |
| Comparative Example 4 | Polarizing plate 2 | methylene chloride | — | 25 | 60 | no | C(1) |
| Comparative Example 5 | Polarizing plate 3 | methylene chloride | — | 25 | 60 | no | C(1) |
| Comparative Example 6 | Polarizing plate 4 | water | — | 30 | 60 | no | A |

(1)A mixed solution of polymer films 1 and 2 was obtained.

What is claimed is:

1. A method for recovery of polymer, comprising:
   contacting a polarizing plate comprising a polarizing element and first and second polymer films having different moisture permeability from each other, on its both surfaces, with at least an aqueous liquid, and then
   applying shear force to the polarizing plate to thereby separate the polarizing element and the first polymer film, and then
   separating the second polymer film from the polarizing element,
   wherein the difference in moisture permeability between the first and second polymer films is equal to or more than 400 g/m$^2$; and the first polymer film adheres to the polarizing element via at least one primer layer.

2. The method of claim 1, wherein the shear force applied to the polarizing plate has a magnitude of 1 N to 200 N per 1 cm$^2$ of the area of the polarizing plate.

3. The method of claim 1, wherein the aqueous liquid is water.

4. The method of claim 1, wherein the aqueous liquid is a mixed liquid of water and a water-miscible compound having at least one hydroxy group and having from 1 to 6 carbon atoms.

5. The method of claim 1, further comprising pulverizing or cutting a polarizing plate into atypical or square chips before it is contacted with at least an aqueous liquid.

6. The method of claim 1, further comprising contacting a polarizing plate with an aqueous liquid to thereby separate a polarizing element and a second polymer film, after a first polymer film and the polarizing element are separated.

7. A method for producing a recycled polymer film, comprising:
melting or dissolving in solvent a polymer recovered according to a method as set forth in claim 1, and
forming a resulting melt or solution into a film.

8. A method for producing a polarizing plate, comprising:
melting or dissolving in solvent a polymer recovered according to a method as set forth in claim 1, then
forming a resulting melt or solution into a film to produce a recycled polymer film, and
laminating the recycled polymer film onto at least one surface of a polarizing element.

9. A method of claim 1, wherein moisture permeability of the first polymer film is smaller than that of the second polymer film.

* * * * *